(12) United States Patent
Sung

(10) Patent No.: US 7,477,512 B2
(45) Date of Patent: Jan. 13, 2009

(54) FIXING MECHANISM FOR STORAGE DEVICE

(75) Inventor: Tzu-Wen Sung, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/605,582

(22) Filed: Nov. 28, 2006

(65) Prior Publication Data

US 2008/0123502 A1 May 29, 2008

(51) Int. Cl.
*H05K 7/12* (2006.01)
*G06F 1/16* (2006.01)
(52) U.S. Cl. .............. 361/685; 361/727; 369/75.11
(58) Field of Classification Search ............ 361/685, 361/727; 369/75.11
See application file for complete search history.

(56) References Cited

U.S. PATENT DOCUMENTS 6,751,093 B1 * 6/2004 Hsu et al. .................. 361/685
6,826,045 B2 * 11/2004 Chen ........................ 361/685
7,031,150 B2 * 4/2006 Chen et al. ................ 361/685
2006/0227502 A1 * 10/2006 Cheng ....................... 361/685

* cited by examiner

*Primary Examiner*—Lisa Lea-Edmonds
*Assistant Examiner*—Ingrid Wright
(74) *Attorney, Agent, or Firm*—Jianq Chyun IP Office

(57) ABSTRACT

The present invention provides a fixing mechanism for positioning and fixing a storage device on a casing plane. The storage device includes two opposite positioning sides each disposed with a fixing pillar. The fixing mechanism includes two positioning boards and a fixing leaf spring. The two positioning boards are disposed on the casing plane and correspond in position to the positioning sides. A guiding groove in each of the positioning boards guides the fixing pillar to an intended position. Flanking at least one of the positioning boards, the fixing leaf spring is fixedly disposed on the positioning board at one end, has a moving end extending along the lengthwise direction of the positioning board at the other end, and has a fixing hole corresponding in position to the guiding groove and penetratable by the fixing pillar slidable into the guiding groove, thus fixing the storage device to the casing plane.

10 Claims, 4 Drawing Sheets

FIXING MECHANISM FOR STORAGE DEVICE

BACKGROUND OF THE INVENTION

1. Field of the Invention

The present invention relates to a fixing mechanism for a storage device, and more particularly, to a fixing mechanism for securing in position and unmounting a storage device without using any tool.

2. Description of the Prior Art

Computers are indispensable to human beings nowadays, whether at home or at workplace. With functions and stability of computers ever increasing, servers nowadays are mostly computers instead of old-time mainframes. A computer typically comprises a monitor, a host computer, and peripherals. A monitor is the screen that a computer user watches at. Peripherals include a mouse, keyboard, printer, scanner, and etc. A host computer deals with computation and storage of data.

A host computer comprises a casing, a motherboard, CPU, memory modules, sound card, display card, and data storage device. A data storage device can be a floppy disk drive, harddisk drive, CD-ROM drive or CD burner. Installation of a data storage device for a host computer intended to function as a server typically involves positioning the data storage device on a positioning frame enclosed by a casing, screwing the data storage device to the positioning frame inside the casing by means of screws and a tool, and shutting the lid of the server to finalize the assembly process.

As mentioned above, the known way of securing in position a data storage device by means of screws and a tool not only makes an assembly process of the data storage device lengthy, but the screws are likely to become missing during the assembly process. For this reason, inventors did propose performing an assembly process of a data storage device without using any tool. Referring to FIG. 1, which is a perspective view showing Taiwan Patent No. M256511 entitled FIXING MECHANISM FOR ELECTRONIC STORAGE DEVICE, a fixing mechanism for an electronic storage device is designed to secure in position a harddisk drive 10. The fixing mechanism comprises a base 110, a plurality of resilient components 130, a plurality of front fixing components 120, and a plurality of rear fixing components 122.

The base 110 carries the harddisk drive 10. Fixedly disposed on the base 110 are a pair of positioning boards 111 aligned in parallel to each other so as to contain and secure in position the harddisk drive 10. Each of the positioning boards 111 is disposed with an L-shaped long groove 111a and an I-shaped sliding groove 111b. Both the L-shaped long groove 111a and I-shaped sliding groove 111b are opened upward. The front fixing components 120 and the rear fixing components 122 are fixedly disposed on both sides of the harddisk drive 10. The harddisk drive 10 is slidable along the long groove 111a and sliding groove 111b by means of the front fixing components 120 and rear fixing components 122.

Resilient components 130 corresponding in position to the outer sides of the sliding grooves 111b of the positioning boards 111 are fixedly disposed on the base 110. The resilient components 130 are resilient enough to limit the displacement of the rear fixing components 122 within the sliding grooves 111b.

Each of the resilient components 130 is a leaf spring fixedly attached to the base 110 at one end and comprises a fixing end 132 and a bent end 131 bending upward and outward. The fixing end 132 is more or less horseshoe-shaped and is configured to hold the rear fixing components 122 and limit the displacement thereof. The bent end 131 is where an external force is exerted on so as to secure in position and unmount the harddisk drive 10.

The implementation of the fixing mechanism comprises the steps of: aligning the front fixing components 120 of the harddisk drive 10 with the long grooves 111a; pushing the harddisk drive 10 to allow the front fixing components 120 to move downward along the long grooves 111a and then move horizontally along the long grooves 111a; moving the rear fixing components 122 downward along the sliding grooves 111b as soon as the rear fixing components 122 become level with the sliding grooves 111b and pushing the resilient components 130 sideward to allow the front fixing components 120 and rear fixing components 122 to reach the ends of the long grooves 111a and sliding grooves 111b respectively. At the end of the implementation of the fixing mechanism, the harddisk drive 10 is firmly held between the base 110 and the positioning boards 111 and thereby become stationary; meanwhile, the front fixing components 120 and rear fixing components 122 are held by the long grooves 111a of the positioning boards 111 and the resilient components 130 and therefore cannot be reversed and withdrawn. The harddisk drive 10 is blocked from the front, rear, top and bottom and thus the harddisk drive 10 is firmly locked.

A limiting portion 112 is formed in the base 110 by pressing. The limiting portion 112 is peripherally disposed with a horseshoe-shaped cleft 112b. Owing to the horseshoe-shaped cleft 112b, the limiting portion 112 is slightly flexible. Disposed on the limiting portion 112 is a bump 112a having a semicircular cross-section. The bump 112a is configured to abut against the harddisk drive 10 to protect the harddisk drive 10 from vibration.

Although the fixing mechanism enables a storage device to be secured in position without using any screw, the fixing mechanism, when applied to a server-oriented host computer, has the following drawbacks. Considering that the resilient components 130 are disposed on the outer sides of the sliding grooves 111b, and that a lid is disposed above a storage device, the length of the resilient components 130 is inevitably limited by the height of the storage device. Referring to the principle of a moment arm, the relatively short resilient components 130 can be pushed sideward only when subjected to a relatively great force, which is also the reason why the resilient components 130 have to be made of highly resilient material such as steel or have to be in the form of a spring, and in consequence production becomes more expensive and difficult. Furthermore, the fixing mechanism comprises positioning boards 111 each disposed with at least one long groove 111a and at least one sliding groove 111b for positioning and securing in position a storage device, and thus the fixing mechanism cannot work without at least four front and rear fixing components. Accordingly, the fixing mechanism is independent of any tool but is not conducive to reduction in the number of parts and components used.

Accordingly, an issue calling for urgent solution involves developing a fixing mechanism for a storage device so as to solve the aforesaid drawbacks of the prior art.

SUMMARY OF THE INVENTION

In light of the aforesaid drawbacks of the prior art, it is a primary objective of the present invention to provide a structurally simple fixing mechanism for a storage device.

Another objective of the present invention is to provide a user-friendly fixing mechanism for a storage device.

Yet another objective of the present invention is to provide a fixing mechanism for mounting and unmounting a storage device without using any tool.

In order to achieve the above and other objectives, the present invention provides a fixing mechanism for positioning and fixing a storage device on a casing plane, the storage device comprising two opposing positioning sides each disposed with a fixing pillar and a plurality of dent portions. The fixing mechanism comprises two positioning boards and a fixing leaf spring. The two positioning boards are disposed on the casing plane, correspond in position to the positioning sides of the storage device respectively, and each of the two positioning boards is disposed with a guiding groove for receiving the fixing pillar of the storage device and guiding the fixing pillar of the storage device to an intended position. The guiding groove comprises a vertical groove portion extending downwardly from a top side of the at least one of the positioning boards and a horizontal groove portion communicating with the vertical groove portion and extending parallel with the casing plane. The fixing pillars on both sides of the storage device slide downward into the vertical groove portions and then slide sideward into the horizontal groove portions. The at least one of the positioning boards is disposed with at least one longitudinally extending spring sheet for resiliently abutting against one of the positioning sides of the storage device. The spring sheet is disposed with positioning protrusion portions for snapping into the dent portions respectively to enhance the fixing mechanism. The spring sheet and the positioning protrusion portions are formed in the at least one of the positioning boards by a pressing process. The fixing leaf spring is disposed on an outer side of at least one of the positioning boards. The fixing leaf spring is made of resilient metal or another material and therefore is resiliently deformable under an external force. The fixing leaf spring is fixedly disposed on the positioning board at one end and has a moving end extending along a lengthwise direction of the positioning board at the other end. The fixing leaf spring comprises a bent portion bending outward and corresponding in position to the vertical groove portion of the guiding groove to allow the fixing pillar of the storage device to be slidable into the vertical groove portion via a gap formed between the bent portion and the at least one of the positioning boards. The fixing leaf spring has a fixing hole corresponding in position to the guiding groove of the positioning board and penetratable by the fixing pillar slidable into the guiding groove, thus fixing the storage device to the casing plane.

A fixing mechanism for a storage device as disclosed in the present invention has features as follows. Two positioning boards are each installed with only one guiding groove such that a fixing pillar of a storage device can slide into the guiding groove. A fixing leaf spring is fixedly disposed on an outer side of one of the positioning boards at one end and has a moving end extending along the lengthwise direction of the positioning board at the other end. Unlike the prior art, the present invention discloses a simple structure, cuts production costs, and reduces the number of parts and components used. As regards the present invention, the moving end extends along the lengthwise direction of the positioning board such that the length of the fixing leaf spring is not subject to the height of the storage device. Given a relatively long moment arm, the moving end can be manipulated with a relatively small force in order to mount/unmount the storage device, and thus the fixing leaf spring need not be made of a highly resilient material; as a result, production costs are cut, and product life is prolonged. Another advantage of the present invention is that spring sheets and positioning protrusion portions of a positioning board, coupled with dent portions of a storage device, enhance the fixing mechanism of the present invention.

DETAILED DESCRIPTION OF THE PREFERRED EMBODIMENT

The following specific embodiment is provided to illustrate the present invention. Others ordinarily skilled in the art can readily gain an insight into other advantages and features of the present invention based on the contents disclosed in this specification.

Figure 1:
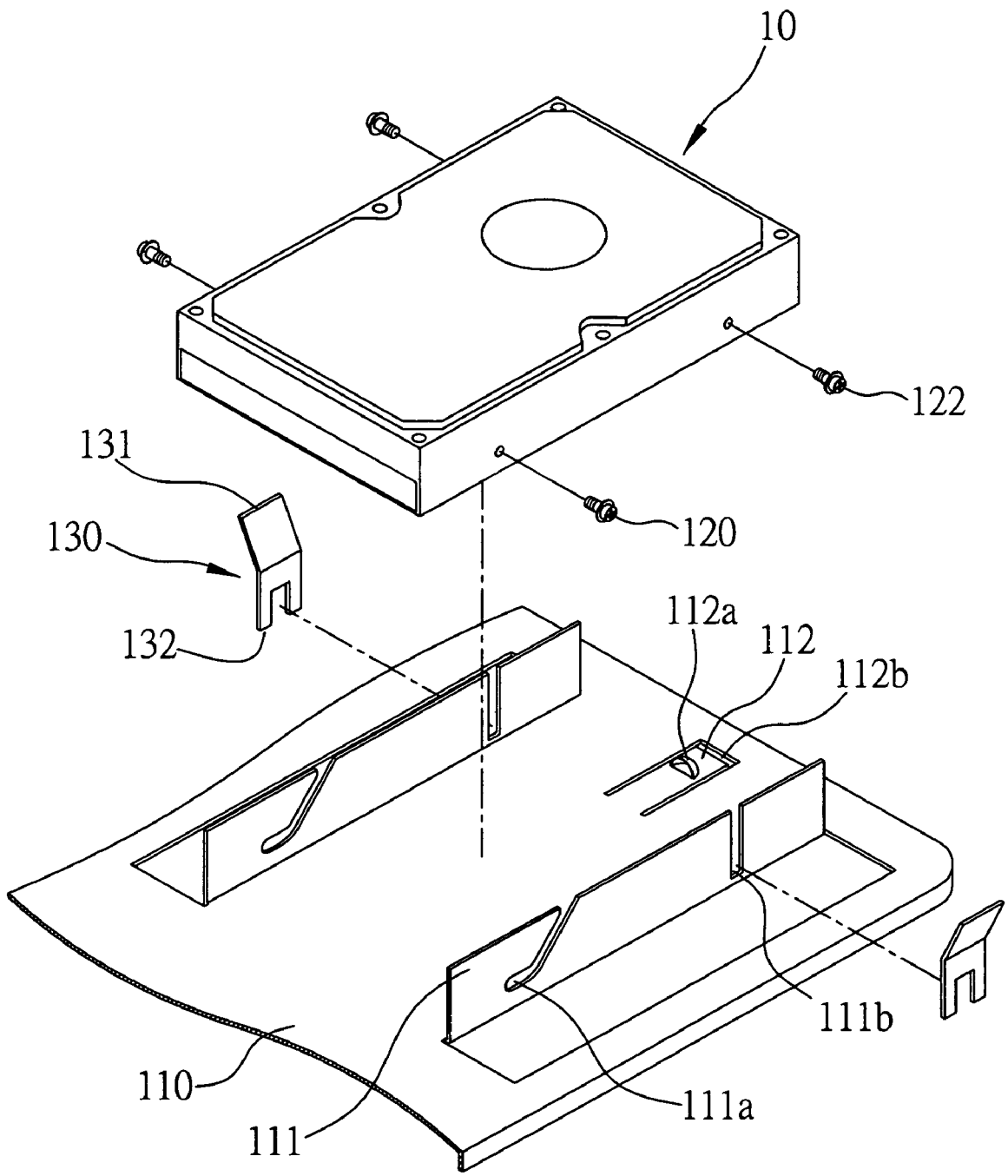
FIG. 1 (PRIOR ART) is a perspective view showing Taiwan Patent No. M256511 entitled FIXING MECHANISM FOR ELECTRONIC STORAGE DEVICE.
Figure 2A:
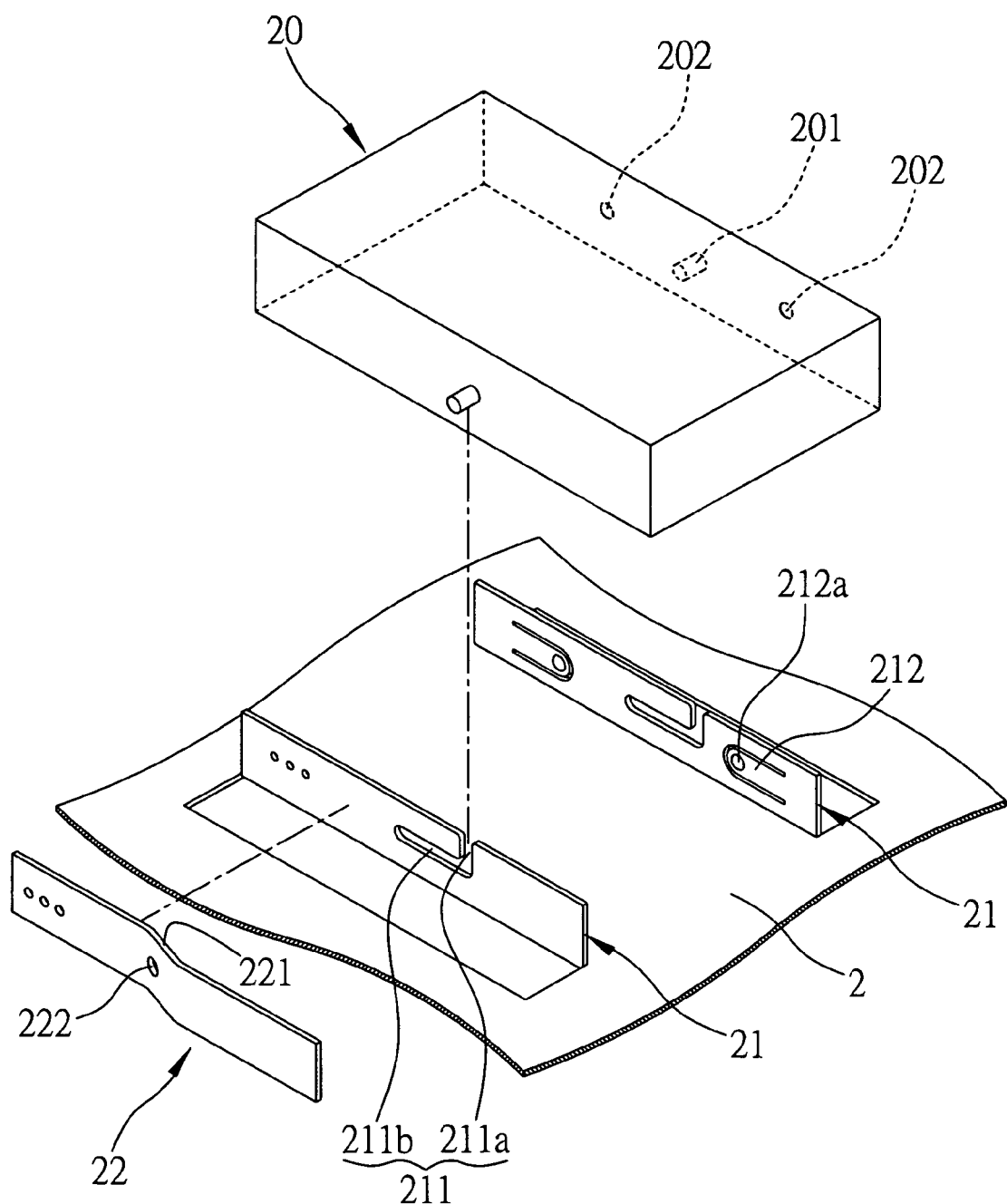
FIG. 2A is a perspective view showing a fixing mechanism for a storage device in accordance with the present invention.

Referring to FIG. 2A, which is a perspective view showing a fixing mechanism for a storage device 20 in accordance with the present invention, the storage device 20 is exemplified by a floppy disk drive, a harddisk drive, a CD-ROM drive or a CD burner. A fixing pillar 201 (for example, a screw or a guiding pillar) and a plurality of dent portions 202 are disposed on two opposing positioning sides of the storage device 20.

A casing plane 2 is disposed with two positioning boards 21 parallel to each other and perpendicular to the casing plane 2 and corresponding in position to the positioning sides of the storage device 20. The two positioning boards 21 are each disposed with an L-shaped guiding groove 211. Sliding the fixing pillars 201 disposed on both positioning sides of the storage device 20 positions the storage device 20 between the two positioning boards 21. The guiding groove 211 comprises a vertical groove portion 211a extending downward from a top side of each of the positioning boards 21 and a horizontal groove portion 211b communicating with the vertical groove portion 211a and extending parallel with the casing plane 2. The fixing pillars 201 on both sides of the storage device 20 slide downward into the vertical groove portions 211a and then slide sideward into the horizontal groove portions 211b.

One of the positioning boards 21 is disposed with two spring sheets 212 extending lengthwise and resiliently abutting against one of the positioning sides of the storage device 20. The spring sheets 212 are disposed with positioning protrusion portions 212a respectively. The positioning protrusion portions 212a snap into the dent portions 202 disposed on the two positioning sides of the storage device 20 respectively to enhance the fixing mechanism. The spring sheets 212 and the positioning protrusion portions 212a are formed in the one of the positioning boards 21 by a pressing process, thus sparing use of any additional parts and components in an assembly process.

The fixing leaf spring 22 is made of resilient metal or others and is resiliently deformable under an external force. The fixing leaf spring 22 is, at one end, fixedly disposed on an outer side of the one of the positioning boards 21 by riveting or welding and has, at the other end, a moving end extending along the lengthwise direction of the positioning board 21. The fixing leaf spring 22 comprises a bent portion 221 bending outward and corresponding in position to the vertical groove portions 211a of the guiding grooves 211. The fixing leaf spring 22 comprises a fixing hole 222 corresponding in position to the ends of the horizontal groove portions 211b of the guiding grooves 211 and penetratable by the fixing pillar 201 slidable into the horizontal groove portion 211b, thus fixing the storage device 20 to the casing plane 2.

Figure 2B:
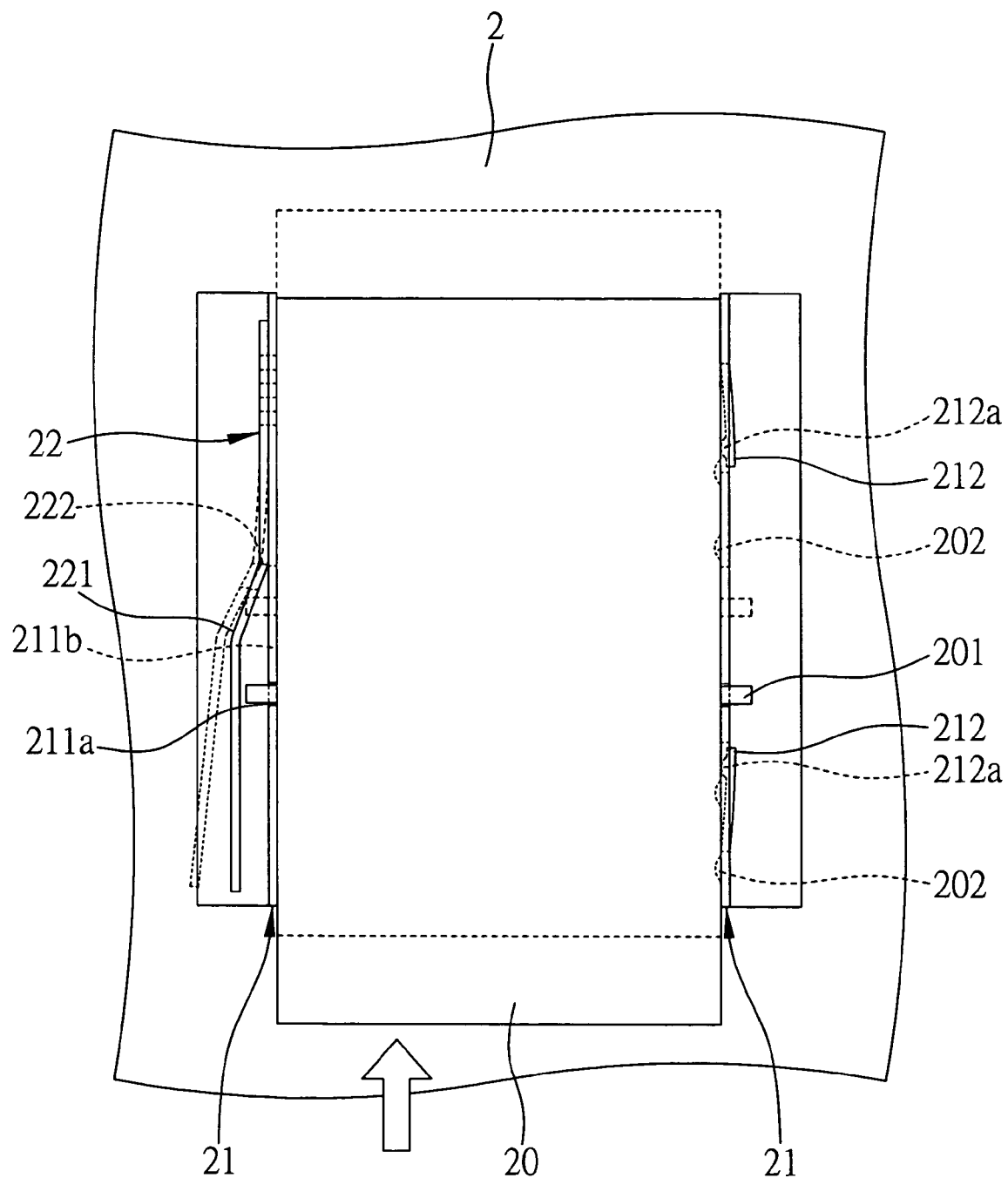
FIGS. 2B and 2C are top plan views showing a well assembled fixing mechanism for a storage device in accordance with the present invention.

FIG. 2B is a top plan view showing a well assembled fixing mechanism for a storage device in accordance with the present invention. The fixing pillar 201 can slide downward into the vertical groove portion 211a via a gap formed between the bent portion 221 of the fixing leaf spring 22 and the positioning board 21, and then pushing the storage device 20 along the horizontal groove portion 211b in the direction of the end of the horizontal groove portion 211b causes the fixing pillar 201 to lift up the fixing leaf spring 22 and slide along the horizontal groove portion 211b; meanwhile, one of the positioning sides of the storage device 2 abuts against the positioning protrusion portions 212a disposed on the spring sheets 212 all the time.

Figure 2C:
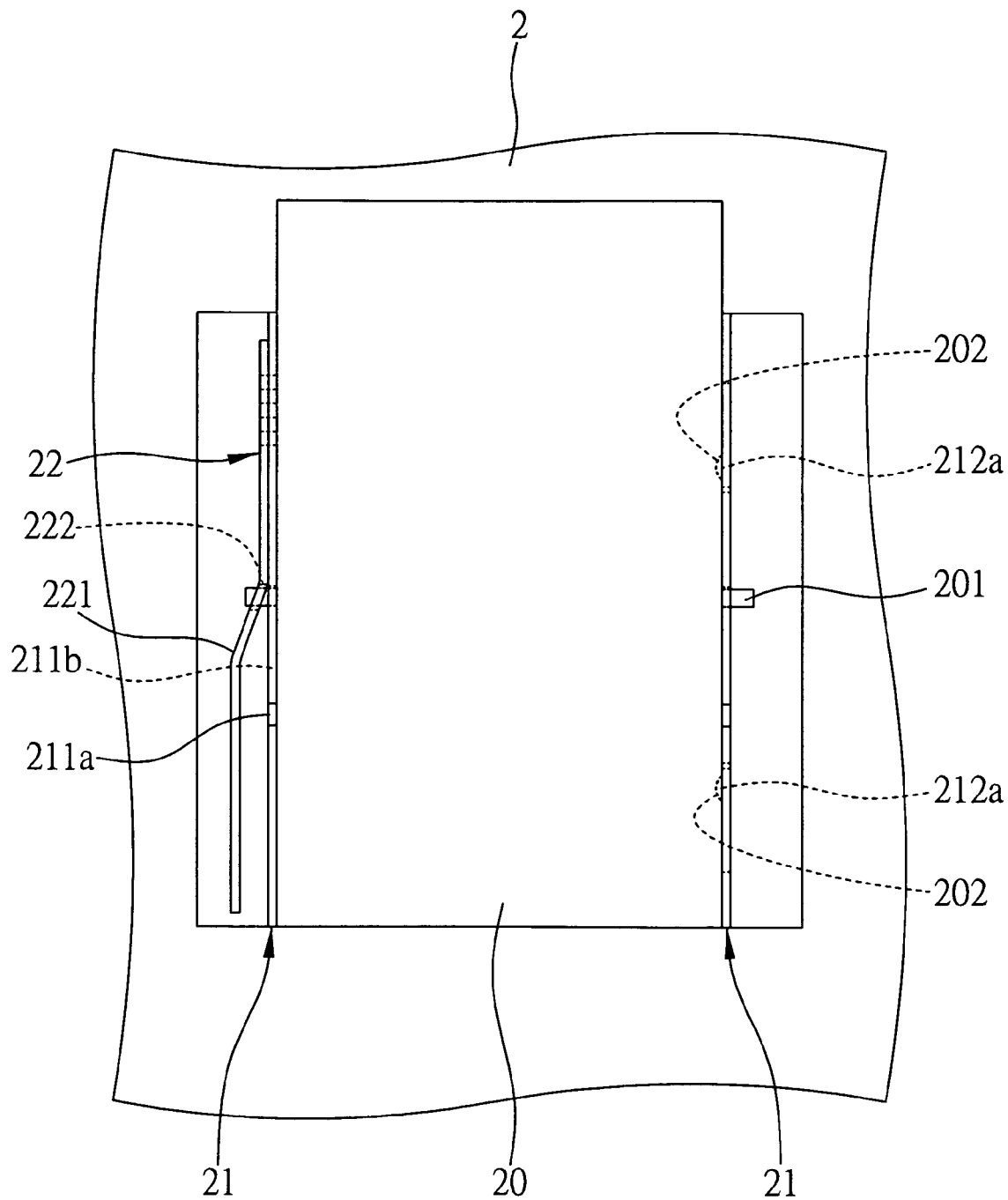

Referring to FIG. 2C, once the fixing pillar 201 reaches the fixing hole 222 of the fixing leaf spring 22, the fixing pillar 201 can penetrate the fixing hole 222, and the lifted fixing leaf spring 22 can return to an original position. Then, the fixing pillar 201 is confined to the horizontal groove portion 211b and fixing hole 222 and thereby is secured in position; meanwhile, the dent portions 202 on the one of the positioning sides of the storage device 20 have reached the positioning protrusion portions 212a respectively and thus the positioning protrusion portions 212a are no longer pressed by the one of the positioning sides of the storage device 20, allowing the positioning protrusion portions 212a to rebound off the positioning boards 21 and snap into the dent portions 202 respectively, and in consequence the storage device 20 is fixed to the casing plane 2.

On the other hand, to unmount the storage device 20, a user may move the moving end of the fixing leaf spring 22 outward to detach the fixing hole 222 of the fixing leaf spring 22 from the fixing pillar 201 of the storage device 20, push the fixing pillar 201 of the storage device 20 along the horizontal groove portion 211b in the direction of the vertical groove portion 211a such that the positioning protrusion portions 212a previously snapped into the dent portions 202 are currently pressed by the positioning side of the storage device 20 and thereby are forced out of the dent portions 202, and remove the storage device 20 from the vertical groove portion 211a as soon as the fixing pillar 201 reaches the vertical groove portion 211a.

A point to note is that this embodiment includes, but is not limited to, disposing the spring sheets 212 and the positioning protrusion portions 212a on only one of the positioning boards 21. Where a large, heavy storage device is to be secured in position, the spring sheets 212 and the positioning protrusion portions 212a may be disposed on both the two positioning boards 21, and the dent portions 202 corresponding in position to the positioning protrusion portions 212 respectively may be disposed on both the two opposing positioning sides of the storage device 20. By the same token, the fixing leaf spring 22 may be disposed on the outer side of each of the two positioning boards 21 to make the fixing mechanism stronger and safer.

As mentioned above, with a fixing mechanism configured for a storage device and comprising a structurally simple positioning mechanism and fixing leaf spring as disclosed in the present invention, a user is able to freely mount/unmount the storage device on/from a casing plane without using any tool, and a manufacturer spares the cost that the manufacturer might otherwise incur from using additional fixing components as taught by the prior art. Also, the present invention allows for an increase/decrease in the number of the positioning protrusion portions and the dent portions of the storage device when necessary, so as to enhance the fixing mechanism without using additional parts and components.

The above embodiment is intended to illustrate the principles and features of the present invention. The present invention is not intended to be limited to the above embodiment. Various modifications and changes made in the above embodiment without departing from the spirit and scope of the present invention will be readily apparent to those skilled in the art. The scope of the present invention should be determined with reference to the appended claims.

What is claimed is:

1. A fixing mechanism for positioning and fixing a storage device on a casing plane, the storage device comprising two opposing positioning sides each disposed with a fixing pillar, the fixing mechanism comprising:

two positioning boards disposed on the casing plane, corresponding in position to the positioning sides of the storage device respectively, and each disposed with a guiding groove for receiving the fixing pillar of the storage device and guiding the fixing pillar of the storage device to an intended position, wherein the guiding groove comprises a vertical groove portion extending downwardly from a top side of the at least one of the positioning boards and a horizontal groove portion communicating with the vertical groove portion and extending parallel with the casing plane; and a fixing leaf spring disposed on an outer side of at least one of the positioning boards, fixedly disposed on the positioning board at one end, having a moving end extending along a lengthwise direction of the positioning board at the other end, and having a fixing hole corresponding in position to the guiding groove of the positioning board and receiving and fixing the fixing pillar at the intended position, thus fixing the storage device to the casing plane, wherein the fixing pillar has a shape corresponding to a shape of the fixing hole, and the fixing leaf spring comprises a bent portion bending outward and corresponding in position to the vertical groove portion of the guiding groove to allow the fixing pillar of the storage device to be slidable into the vertical groove portion via a gap formed between the bent portion and the at least one of the positioning boards, and the fixing hole is disposed in the bent portion.

2. The fixing mechanism of claim 1, wherein the at least one of the positioning boards is disposed with at least one longitudinally extending spring sheet for resiliently abutting against one of the positioning sides of the storage device.

3. The fixing mechanism of claim 2, wherein the one of the positioning sides of the storage device is disposed with dent portions, and the spring sheet is disposed with positioning protrusion portions for snapping into the dent portions respectively to enhance the fixing mechanism.

4. The fixing mechanism of claim 3, wherein the spring sheet and the positioning protrusion portions are formed in the at least one of the positioning boards by a pressing process.

5. The fixing mechanism of claim 1, wherein the fixing hole corresponds in position to the end of the horizontal groove portion of the guiding groove.

6. The fixing mechanism of claim 5, wherein the fixing leaf spring is made of resilient metal and is resilient deformable under an external force.

7. The fixing mechanism of claim 6, wherein the fixing leaf spring is fixedly disposed on the at least one of the positioning boards at one end by one of riveting and welding.

8. The fixing mechanism of claim 1, wherein the fixing pillar is one of a screw and a guiding pillar.

9. The fixing mechanism of claim 1, wherein the storage device is one selected from the group consisting of a floppy disk drive, a harddisk drive, a CD-ROM drive, and a CD burner.

10. The fixing mechanism of claim 1, wherein the fixing hole is penetrated by the fixing pillar such that the fixing pillar contacts a cross-section of the fixing leaf spring.

* * * * *